(12) United States Patent
Tillotson et al.

(10) Patent No.: US 8,672,258 B1
(45) Date of Patent: Mar. 18, 2014

(54) POWER TRANSMISSION FOR AIRCRAFT FLIGHT TESTING

(75) Inventors: Brian J. Tillotson, Kent, WA (US); Michael A. Loudiana, Maple Valley, WA (US)

(73) Assignee: The Boeing Company, Chicago, IL (US)

(*) Notice: Subject to any disclaimer, the term of this patent is extended or adjusted under 35 U.S.C. 154(b) by 1217 days.

(21) Appl. No.: 12/545,551

(22) Filed: Aug. 21, 2009

(51) Int. Cl.
*B64D 47/00* (2006.01)

(52) U.S. Cl.
USPC .......................................................... 244/1 R

(58) Field of Classification Search
USPC ................................................. 343/708, 715
See application file for complete search history.

(56) References Cited

U.S. PATENT DOCUMENTS

| | | | |
|---|---|---|---|
| 4,931,805 A * | 6/1990 | Fisher | 343/715 |
| 5,503,350 A * | 4/1996 | Foote | 244/1 R |
| 5,742,255 A * | 4/1998 | Afendras | 343/713 |
| 6,012,675 A * | 1/2000 | Cocatre-Zilgien | 244/16 |
| 6,414,573 B1 * | 7/2002 | Swineford et al. | 333/238 |
| 6,609,825 B2 * | 8/2003 | Ice et al. | 374/138 |
| 2003/0223756 A1* | 12/2003 | Tatum et al. | 398/135 |
| 2004/0076428 A1* | 4/2004 | Green et al. | 398/9 |
| 2006/0024483 A1* | 2/2006 | Koch et al. | 428/292.1 |
| 2007/0019693 A1 | 1/2007 | Graham | |
| 2007/0183715 A1* | 8/2007 | Murshid et al. | 385/31 |
| 2007/0274226 A1 | 11/2007 | Tillotson | |
| 2008/0017239 A1 | 1/2008 | Tillotson | |
| 2008/0275572 A1 | 11/2008 | Tillotson | |
| 2009/0116850 A1* | 5/2009 | Maryfield | 398/202 |

* cited by examiner

*Primary Examiner* — Benjamin P Lee
*Assistant Examiner* — Benjamin Gomberg
(74) *Attorney, Agent, or Firm* — Ostrager Chong Flaherty & Broitman P.C.

(57) ABSTRACT

Systems and methods for transferring power through an aircraft window and thereby powering temporary externally mounted equipment, such as flight test instrumentation, without cutting or drilling holes in the airplane to run wire for a flight test or experiment. One embodiment uses a light source and a photovoltaic cell to transfer power from inside to outside the aircraft. Another embodiment uses an RF source and a rectenna to transfer power from inside to outside the aircraft.

17 Claims, 4 Drawing Sheets

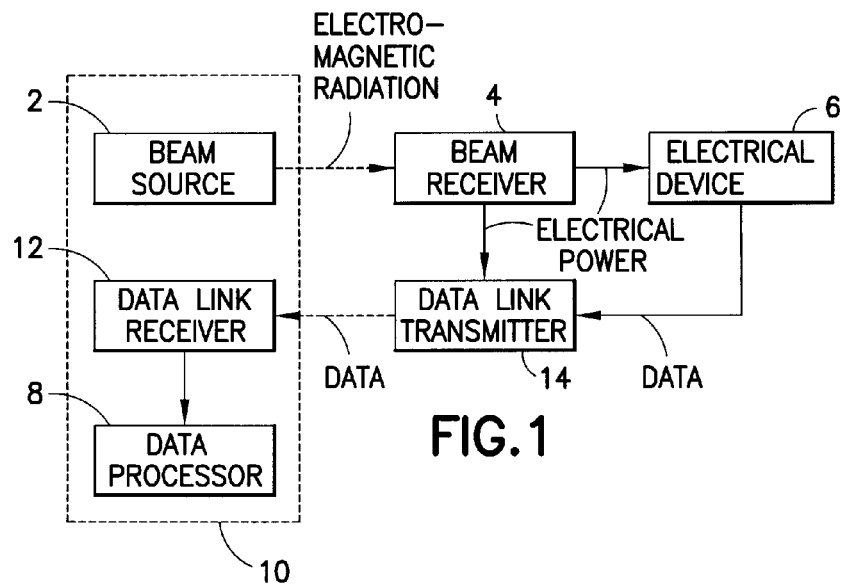
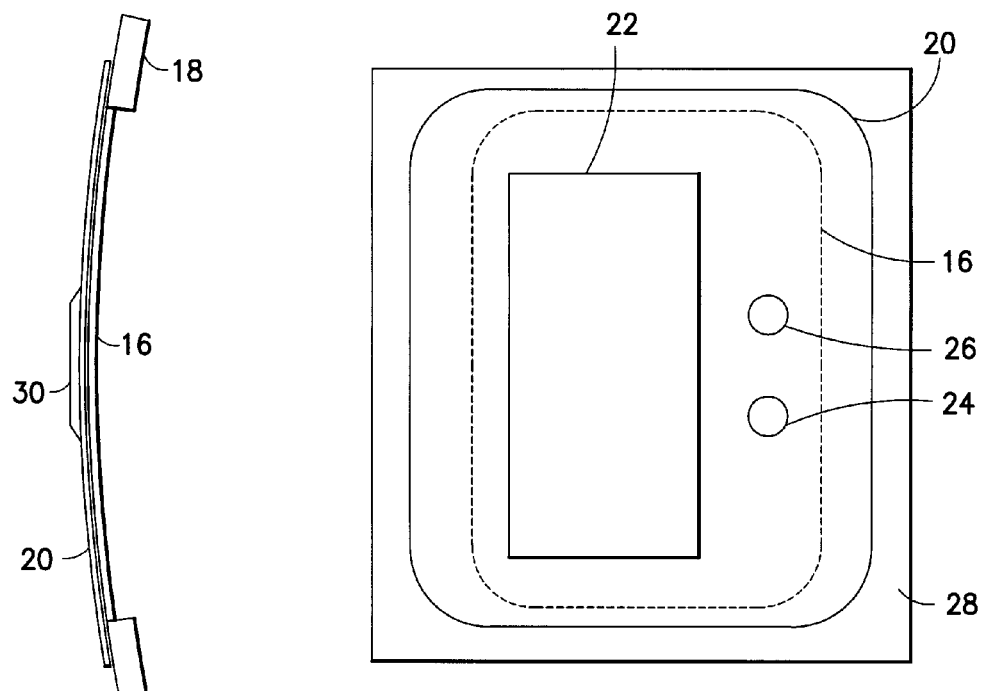

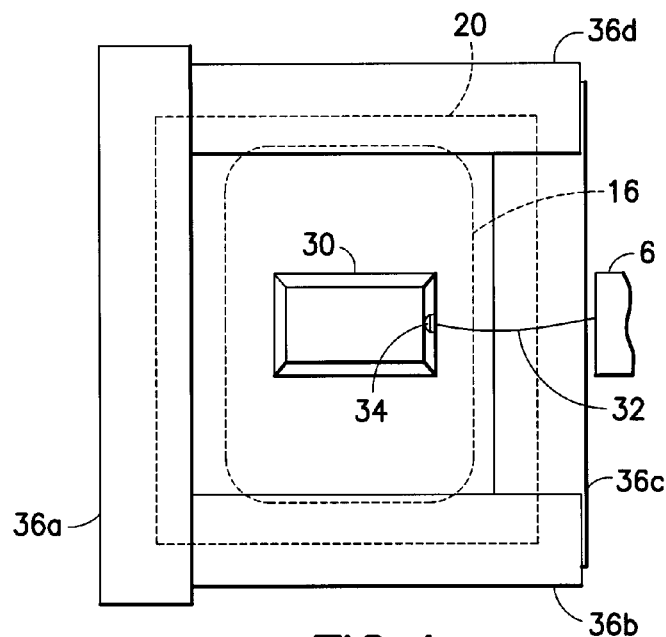
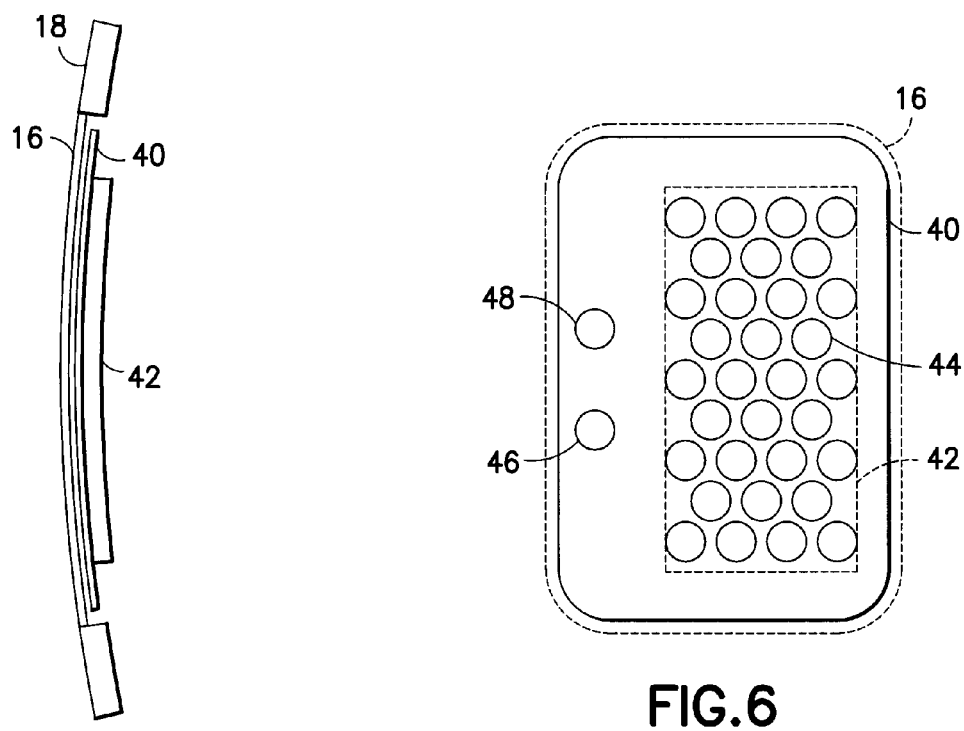

POWER TRANSMISSION FOR AIRCRAFT FLIGHT TESTING

BACKGROUND

This invention generally relates to systems for providing electrical power to electronic devices without a wire or other connection to a power source. It also relates to systems for providing electronic signals to an electronic device without wire connection.

In particular, the invention relates to systems for providing electrical power to flight test equipment externally mounted on an airplane. The overall problem is to provide an improved system for collecting data to satisfy flight test requirements. In an existing system, test wiring is installed in the airplane. Such test wiring typically carries power to test instruments and carries data from those instruments to data recording devices or telemetry transmitters. This wire adds substantial weight to the airplane, which may complicate the test. The installation of wire also requires substantial labor. Furthermore, in accordance with a known technique, holes are drilled in the airplane to provide paths through which to string wires. The system disclosed herein addresses the specific problem of reducing the amount of wiring installed and the number of holes drilled to support a test.

The term "test" as used herein means any operation where an aircraft carries equipment of a temporary nature, often under an experimental airworthiness certificate. A common example is flight test instrumentation where the aircraft itself is the subject of the test. Another example is "captive carry" tests where an airplane carries a component of a missile or spacecraft so it can be easily monitored during a flight and retrieved afterward for repeated tests. A third example is a one-time set of measurements for scientific research or technology experimentation, where initial success with an ad hoc device might lead to later work with more robust installations on the aircraft.

There are several existing solutions: (1) string wires for power and data, and drill holes where needed; (2) use wireless links for data transfer, but continue to use wires to power the instrumentation; and (3) use wireless links for data transfer, but use batteries to power the instrumentation.

The first known solution has the disadvantage that wire adds substantial weight to the airplane. This may complicate the test plan, e.g., by requiring that some equipment be off-loaded to meet weight and balance constraints for some tests, then re-installed for other tests. In addition, a wire harness requires substantial labor to design and install before the test program and to remove afterward. Furthermore, holes drilled in the airplane to provide paths through which to string wires must be designed and checked by engineering, approved by the Federal Aviation Administration or the Department of Defense, and then drilled, filled, smoothed, sanded, and inspected. If the flight test aircraft is used after completion of the test program, the holes must be filled after the wires are removed, and then periodically re-inspected and maintained.

The second known solution has the advantage that wireless links can reduce the total number of wires, and therefore somewhat reduce the weight of the added equipment and the labor to install the test equipment. However, holes must be drilled for power cables, even if no data wires accompany them, so this solution does not reduce the hole count as much as the wire count.

The third known solution has the advantage that wireless links with battery-powered instrumentation can substantially reduce both the number of wires and the number of holes. However, the batteries add substantial weight, and they must be replaced or recharged after each test flight. Replacing a battery or attaching a recharge cable typically requires removal and replacement of an access panel, so the labor required is substantial.

There is a need for a solution that avoids the disadvantages of the foregoing existing solutions.

BRIEF SUMMARY

In the embodiments disclosed herein, an electromagnetic beam source inside a test vehicle transmits an electromagnetic power beam through a transparent section of the test vehicle to a receiver attached to the outside of the vehicle. The receiver converts the power of the beam to electrical power, which is used to power part of the test instrumentation or telemetry. The test instrumentation or telemetry device powered by the electromagnetic beam uses wireless communication to transmit and receive data. Thus, the instrumentation or telemetry device requires no wires for power or data from the inside of the aircraft.

In one embodiment, the electromagnetic power beam is a beam of light (visible, infrared, and/or ultraviolet). The beam source is a laser, LED, incandescent bulb, or other source of light. The transparent section is a window or cockpit canopy. The electromagnetic receiver is one or more photovoltaic cells. Optics to concentrate, collimate, or steer the beam may be associated with the beam source, the receiver, or both.

In another embodiment, the electromagnetic power beam is a beam of microwaves. The beam source is a magnetron, klystron, solid state amplifier, or other source of microwaves. The transparent section may be a window or cockpit canopy (if they are not coated with material that blocks microwaves) or it may be a non-metallic skin section, e.g. fiberglass, that is transparent to RF. The electromagnetic receiver is a rectenna. As used herein, the term "rectenna" is short for "rectifying antenna", a device for receiving a RF power beam and producing DC electrical power.

The embodiments disclosed herein do not require power wires to be strung from power sources inside the test aircraft to test equipment outside the aircraft, and do not require data wires to be strung from test equipment outside the aircraft to recorders or processors inside the aircraft. The disclosed embodiments also do not require holes to be drilled to accommodate such wires. Unlike wireless test devices with battery power, the disclosed embodiments do not include batteries.

More specifically, use of the systems disclosed herein avoids substantial mass associated with power wires and data wires. Use of the systems disclosed herein also avoids the labor associated with designing, installing, and removing these wires. In addition, the disclosed systems avoid introducing many holes in the test aircraft. This avoids engineering the holes, installing and inspecting them, filling them in after the test program, and inspecting and maintaining them for the life of the aircraft. Compared to wireless links with battery-powered instrumentation, the systems disclosed herein avoid the substantial mass of batteries, as well as the labor to remove access panels, replace or recharge each battery, and replace access panels.

Other aspects of the invention are disclosed and claimed below.

BRIEF DESCRIPTION OF THE DRAWINGS

FIG. 1 is a block diagram showing the architecture of a system for power beam transmission and reception aboard an aircraft.

FIG. 2 is a drawing showing a sectional side view of an external window plate in accordance with one embodiment of the invention.

FIG. 3 is a drawing showing an inside face view of the external window plate depicted in FIG. 2.

FIG. 4 is a drawing showing an outside face view of the installed external window plate depicted in FIGS. 2 and 3.

FIG. 5 is a drawing showing a sectional side view of an internal window plate in accordance with one embodiment of the invention.

FIG. 6 is a drawing showing an inside face view of the internal window plate depicted in FIG. 5.

Reference will hereinafter be made to the drawings in which similar elements in different drawings bear the same reference numerals.

DETAILED DESCRIPTION

Figure 7:
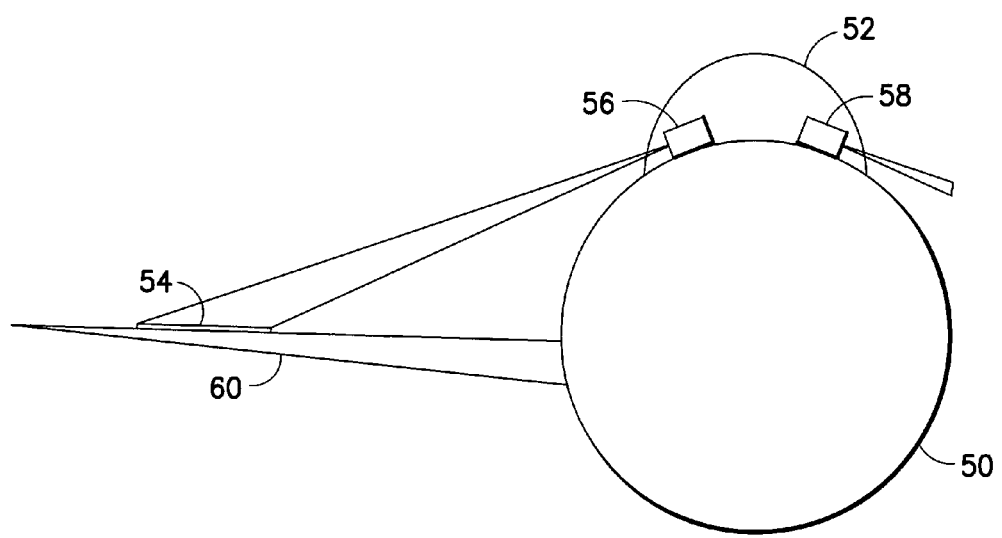
FIG. 7 is a drawing showing an embodiment in which optical power is transmitted across a long path of free space.

Various embodiments of a system for providing electrical power to an electrical device mounted outside an aircraft will now be disclosed. Each disclosed embodiment comprises a source of electromagnetic radiation mounted inside a cabin of the aircraft, and a receiver configured to convert electromagnetic radiation from the source into electrical power, the receiver being mounted outside the aircraft cabin and electrically connected to the electrical device.

The system architecture is depicted in FIG. 1. The system components comprise a beam source 2 for transmitting a beam of electromagnetic radiation, a beam receiver 4 for converting received electromagnetic radiation into electrical power, and an electrical device 6 (e.g., test instrumentation) connected to the beam receiver for receiving electrical power therefrom. The beam source 2 will be mounted inside the cabin 10 (indicated by the dashed rectangle in FIG. 1) of the aircraft. The beam receiver 4 and the electrical device 6 will be mounted outside the aircraft cabin. The system components further comprise an optical datalink transmitter 14 to transfer data from the electrical device 6 to a datalink receiver 12 located inside the aircraft cabin 10. The optical datalink transmitter 14 is located outside the aircraft cabin 10 and receives electrical power from the beam receiver 4. The data received by the datalink receiver 12 is in turn sent to a data processor 8, also located inside the aircraft cabin 10. The beam source 2, datalink receiver 12 and data processor 8 are powered by the on-board electrical power system (not shown in FIG. 1) of the aircraft.

In accordance with an alternative exemplary embodiment, the electrical device 6 may be an antenna that receives signals (e.g., GPS signals) from a spacecraft or from Earth, in which case the antenna would not receive electrical power from the beam receiver 4. In accordance with this embodiment, the datalink transmitter 14 receives electrical power from the beam receiver 4 to enable the transmitter 14 to transmit data from the antenna to the datalink receiver 12. In this example, the system components include an optical datalink transmitter for transferring data from the antenna, through a cabin window in the aircraft, to a datalink receiver inside the aircraft cabin; an optical beam source located inside the aircraft cabin, with the beam aimed at the cabin window; and a photovoltaic beam receiver attached to the outside of the cabin window, wired to provide electrical power to the optical datalink transmitter.

In accordance with a more general embodiment, the system comprises a bidirectional optical datalink with a data transmitter inside the aircraft cabin and a data receiver outside the aircraft cabin, in addition to the aforementioned data receiver inside and data transmitter outside the aircraft cabin. The beam receiver, external data transmitter and external data receiver are integrated in a first plate that attaches to the outside of a cabin window. The beam source or transmitter, internal data transmitter and internal data receiver are integrated in a second plate that attaches to the inside of the same cabin window. This embodiment is illustrated in FIGS. 2-6.

FIG. 2 shows an external plate 20 attached over the outside of a cabin window 16, such as of an airplane. The external plate is preferably attached to the portion of fuselage 18 which surrounds the cabin window 16. As seen in FIG. 2, the external plate 20 is thin to minimize drag, with only a small, smooth-edged protrusion (hereinafter "circuit block") 30 to accommodate any circuit elements that are thicker than the plate 20.

As shown in FIG. 3, the surface of external plate 20 that faces inward contains a photovoltaic beam receiver 22 for power, an optical (or infrared) data receiver 24, and an optical (or infrared) data transmitter 26, all of which fit within the border of the window 16, indicated by a dashed line in FIG. 3. Parts of the plate's inner surface that extend beyond the window 16 are covered with a compliant seal material 28. The seal 28 keeps dust and rain from getting between the plate 20 and the window 16, so the power beam and the data links are not blocked or degraded.

FIG. 4 shows the same external plate 20 (indicated by a dashed rectangle) seen from the outside. In this temporary installation, strips of tape 36a-d are used to hold the edges of the plate 20 securely to the fuselage, to smooth the airflow from the fuselage to the plate, and to help seal out water and dust. A connector 34 on the circuit block 30 allows a variety of devices to be connected to the external plate 20. Wire 32 carries power output by the photovoltaic receiver 22 of external plate 20 to an electrical device 6 mounted outside the aircraft. Additional wires (not shown) provide bidirectional data transfer between electrical device 6 and external data receiver 24 and external data transmitter 26.

Referring again to FIG. 3, the circuit block 30 incorporates electronic circuitry configured to receive electrical power from photovoltaic receiver 22 and provide conditioned and/or regulated electrical power to the externally mounted electrical device and to the external data receiver 24 and external data transmitter 26. The circuit block 30 further incorporates electronic circuitry configured to receive data from external data receiver 24 and transmit that data to the electrical device, as well as electronic circuitry configured to receive data from the electrical device and transmit that data to external data transmitter 26.

FIGS. 5 and 6 show the corresponding internal plate 40. The internal plate 40 is smaller than the external plate so it fits inside the window alcove in the fuselage wall 18. Internal plate 40 has a data receiver 48 and a data transmitter 46 positioned to match (i.e., confront) the data transmitter and date receiver respectively (items 26 and 24 respectively in FIG. 3) on the external plate. This particular embodiment uses an array 42 of LEDs 44 as the power transmitter, likewise positioned to match the power receiver (item 22 in FIG. 3) on the external plate.

Because the embodiment shown in FIGS. 2-6 does not require any penetrations of the fuselage, it can be approved for temporary use in flight with much less labor and delay than the prior art approach of drilling holes and running wires through the airplane skin.

The foregoing example illustrates the flexibility of the system disclosed herein. In the event that the external device is a test instrument that measures RF signals, one might choose an optical power beam rather than an RF beam so there is no interference with the RF measurements that are the goal of the experiment. In other applications, one might choose a microwave power beam for improved efficiency or to avoid interfering with an optical measurement.

When an optical power beam is used, the data receivers and data transmitters preferably operate at shorter wavelengths than the photovoltaic power receiver and optical power transmitter. Using this preferred approach, the long-wavelength photons of the power beam have less energy than the bandgap of the data receivers. The power beam therefore cannot interfere with the data link, even when the power beam carries large amounts of power right next to the data receivers.

The ability to transmit beam power using microwave radiation can be used to deal with a different problem. In a case where a new type of fighter plane was being tested, early tests indicated unexpected flutter affecting the ailerons at high angle of attack. The test team decided to collect high-rate surface pressure data from the top surfaces of the wing near each aileron. The test crew installed piezoelectric pressure sensors on the wing skin with tape; they also installed a data acquisition unit (DAU) near each wing tip to digitize signals from the sensors. In prior art, test engineers would design a wire harness to transport power to these DAUs from the aircraft bus and to transport data from the DAUs to a processor inside the fuselage. Test mechanics would create the holes and string the wires.

In accordance with the novel teaching disclosed herein, the test crew can instead install a patch containing an array of photovoltaic cells with tape near the piezoelectric sensors on each wing. FIG. 7 shows a wing 60 of a fighter plane. An array 54 of photovoltaic cells, mounted on wing 60, is shown much larger than actual size in FIG. 7. The piezoelectric sensors and DAUs mentioned in the previous paragraph are not shown in FIG. 7. The test crew can also install a pair of infrared LEDs 56 and 58 with collimating optics in the cockpit, typically behind the pilot's headrest. Each LED produces several watts of infrared power. The optics are aligned so that infrared light from each LED passes through the cockpit canopy 52 and impinges on the photovoltaic cells 54 near each aileron, producing a watt or two of power for the DAUs (not shown in figure). The DAUs use wireless RF data links to transmit pressure data to a processor (not shown in FIG. 7) inside the fuselage 50 of the fighter plane.

Figure 8:
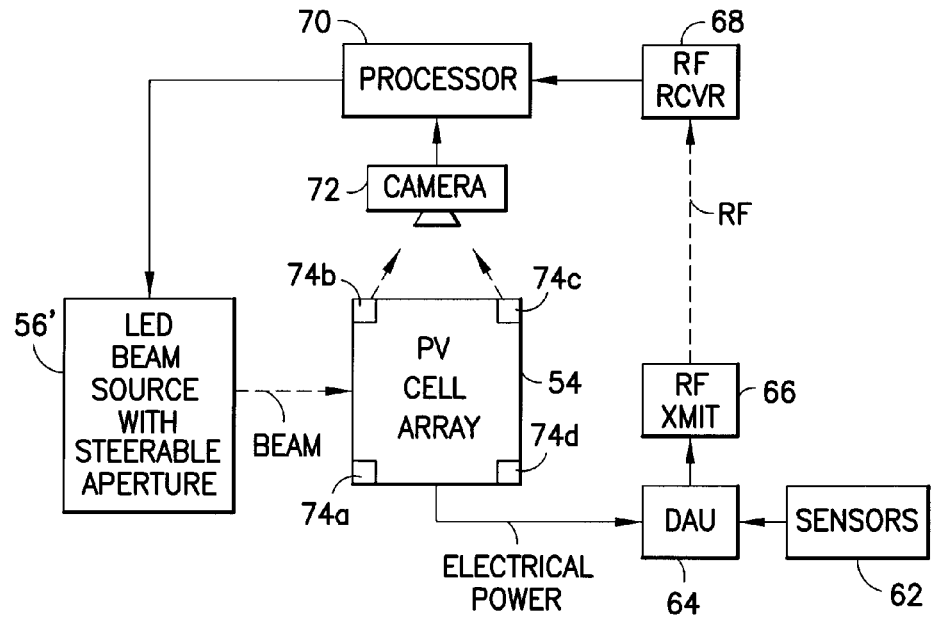
FIG. 8 is a block diagram showing components of the embodiment depicted in FIG. 7.

Because the wing may flex substantially during flight, this embodiment includes means for the IR beam source to keep its beam pointed at the photovoltaic cell array 54 as the wing 60 moves. FIG. 8 is a block diagram showing the architecture of a system for acquiring surface pressure data from the top surfaces of a wing near each aileron. The photovoltaic cell array 54 has patches 74*a-d* of retroreflector tape at each corner of the array. An IR beam source 56' that includes a steerable transmit aperture is mounted inside the plane cockpit and is directed to transmit light beams through the cockpit canopy and toward the photovoltaic cell array 54. A small infrared camera 72 is also mounted inside the cockpit and is connected to a processor 70 located inside the plane fuselage. To track the retroreflector tape, the camera 72 receives light which was transmitted by source 56' and then reflected by the patches 74*a-d* of retroreflector tape. (Although not shown in FIG. 8, the light reflected from the reflector tape is generally parallel to the incident light from the LED beam source.) The processor 70 uses data from the camera 72 to steer the IR beam source 56' toward the photovoltaic cell array 54. As light impinges on the photovoltaic cell array 54, electrical power is output to each DAU 64. The DAU 64 acquires data from a multiplicity of piezoelectric sensors 62, which are attached to the top surface of the wing. The DAU 64 outputs the acquired sensor data to a radiofrequency transmitter 66 mounted on the wing. The radiofrequency transmitter 66 transmits the acquired data to a radiofrequency receiver 68, which then sends the received data to the processor 70.

In the foregoing example, the prior art arrangement requires that many meters of wire be installed, with numerous holes being drilled at many places within each wing. In contrast, the system shown in FIGS. 7 and 8 requires engineering and installation of an LED pair and their mounting bracket. While not trivial, the engineering and installation affect only a single location within the aircraft. Taping the photovoltaic cells to the wing for this embodiment does not require drilling or cutting the airplane, so the engineering of that installation is relatively simple.

Figure 9:
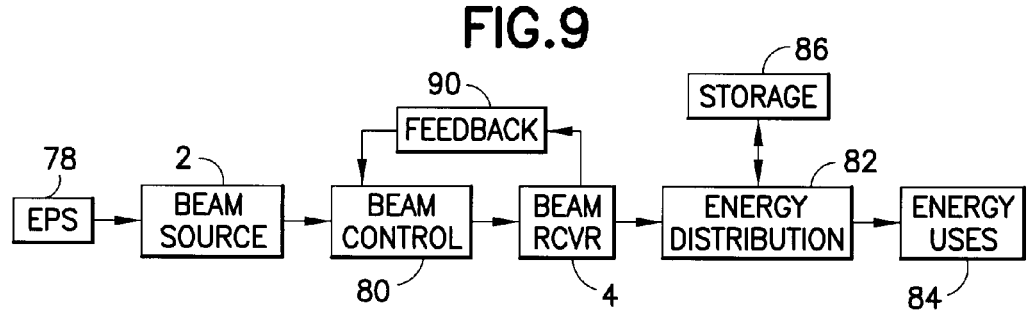
FIG. 9 is a block diagram showing the architecture of an alternative system for power beam transmission and reception aboard an aircraft.

The system architecture in accordance with yet another embodiment is depicted in FIG. 9. The system components comprise an electrical power system 78, a beam source 2 (powered by system 78) for transmitting a beam of electromagnetic radiation, a beam receiver 4 for converting received electromagnetic radiation into electrical power, and at least a minimal energy distribution system 82 to transfer power from the receiver 4 to the energy uses 84, e.g., test instrumentation, and to storage 86. This embodiment also includes a beam control element 80 and a feedback element 90, which elements can be employed in situations where the beam receiver 4 moves relative to the beam source 2, and this relative motion is large enough to move the receiver 4 out of the beam. For example, if the receiver 4 were mounted near a wing tip, in-flight flexing of the wing may cause the receiver to move up or down by several feet. If the power beam is only a foot or two wide, then the beam control element 80 can be used to continuously point the beam at the receiver 4 under the control of a feedback element 90 that helps track the receivers position.

In other cases, a power transmission system using microwave radiation, rather than light, may be preferred. For example, a large transport airplane may be tested using a microwave-based system. The test team might decide to collect stress data from a flap actuator mechanism on each wing of the transport airplane. Strain gauges would be installed at several points along the flap track. A DAU would also be installed nearby, connected to receive data from the strain gauges. Because this aircraft may be tested in clouds, snow, or heavy rain that would block an optical beam, a microwave-based system for providing power to the strain gauges and to the DAU would be preferred. Several rectenna dipole elements would be taped onto the upper surface of each wing to power the DAU. A small microwave beam source would be mounted inside the cabin on each side of the fuselage, facing out a cabin window toward the rectenna elements on each wing. The rectenna dipole elements would convert received microwave radiation into electrical power for use by the test instrumentation.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

The invention claimed is:

1. A system comprising:
a fuselage of an aircraft containing a pressurized volume, said fuselage comprising a transparent portion which is transparent to the passage of an electromagnetic beam therethrough;
a source of electromagnetic radiation that emits electromagnetic radiation as an electromagnetic beam, said source being mounted inside said fuselage within said pressurized volume;
a portion of the aircraft disposed outside said fuselage and having an external surface;
an electrical device attached to said portion of the aircraft;
a receiver configured to convert an impinging electromagnetic beam from said source into electrical power, said receiver being mounted on said external surface at a location which is separated from said transparent portion of said fuselage by air along the path of an electromagnetic beam emitted from said source and received by said receiver; and
an electrical connection between said receiver and said electrical device for carrying electrical power from said receiver to said electrical device.

2. The system as recited in claim 1, wherein said electromagnetic radiation is light.

3. The system as recited in claim 2, wherein said receiver comprises at least one photovoltaic cell.

4. The system as recited in claim 1, wherein said electromagnetic radiation is microwaves.

5. The system as recited in claim 4, wherein said receiver is a rectenna.

6. The system as recited in claim 1, wherein said transparent portion of said fuselage is a window.

7. The system as recited in claim 1, wherein said transparent portion of said fuselage is a cockpit canopy.

8. The system as recited in claim 1, wherein said electromagnetic radiation is microwaves and said transparent portion comprises a composite of electrically nonconductive fibers and resin.

9. The system as recited in claim 1, further comprising a plate into which said source is integrated, said plate being attached to the inside of a window of said aircraft.

10. The system as recited in claim 9, said plate comprising an optical data transceiver.

11. The system as recited in claim 1, wherein the transparent portion through which the electromagnetic beam passes is not an optical fiber.

12. A system comprising:
an electrical device attached to an exterior surface of an aircraft;
a source of electromagnetic radiation that produces a beam of electromagnetic radiation, said source being mounted inside a fuselage of the aircraft;
a receiver configured to convert electromagnetic radiation from said source into electrical power, said receiver being mounted outside said fuselage and electrically connected to said electrical device;
means for tracking the location of said receiver relative to said source while said aircraft is in flight; and
means for steering said beam of electromagnetic radiation so that it is directed toward said receiver while said aircraft is in flight.

13. A system comprising:
an electrical device attached to an exterior surface of an aircraft;
a source of electromagnetic radiation that produces a beam of electromagnetic radiation, said source being mounted inside a fuselage of the aircraft;
a receiver configured to convert electromagnetic radiation from said source into electrical power, said receiver being mounted outside said fuselage and electrically connected to said electrical device; and
a plate into which said receiver is integrated, said plate being attached to the outside of a portion of the fuselage that surrounds a cabin window of the aircraft.

14. The system as recited in claim 13, said plate comprising an optical data transceiver electrically connected to said electrical device.

15. The system as recited in claim 13, further comprising sealant material arranged to prevent water from encroaching between said plate and said fuselage.

16. A system for providing electrical power to an electrical device mounted outside an aircraft, comprising:
a first plate attached to the inside of a portion of a fuselage that surrounds a cabin window of said aircraft;
a source of electromagnetic radiation integrated into said first plate;
a second plate attached to the outside of said window; and
a receiver configured to convert electromagnetic radiation from said source into electricity, said receiver being integrated into said second plate and electrically connected to said electrical device.

17. The system as recited in claim 16, said first plate comprising a first optical data transceiver, and said second plate comprising a second optical data transceiver optically coupled to said first optical data transceiver and electrically connected to said electrical device.

* * * * *